US012786282B1

(12) United States Patent
Segal et al.

(10) Patent No.: US 12,786,282 B1
(45) Date of Patent: *Nov. 3, 2026

(54) STATIC ANALYSIS TECHNIQUES FOR API PATH DISCOVERY

(71) Applicant: Wiz, Inc., New York, NY (US)

(72) Inventors: Assaf Segal, Tel Aviv (IL); Shir Tamari, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/222,572

(22) Filed: May 29, 2025

(51) Int. Cl.
*H04L 67/51* (2022.01)
*H04L 45/02* (2022.01)

(52) U.S. Cl.
CPC .............. *H04L 67/51* (2022.05); *H04L 45/02* (2013.01)

(58) Field of Classification Search
CPC ................................ H04L 67/51; H04L 45/02
USPC .......................................................... 709/203
See application file for complete search history.

(56) References Cited

U.S. PATENT DOCUMENTS 10,200,389 B2 2/2019 Rostamabadi et al.
11,683,333 B1 6/2023 Dominessy et al.
11,907,163 B1* 2/2024 Malamud .............. G06F 16/128
2021/0019193 A1* 1/2021 Ffrench ................. G06F 9/5061
2021/0089375 A1* 3/2021 Ghafourifar ............ G06F 9/543
2021/0099483 A1 4/2021 Shukla
2021/0240551 A1* 8/2021 Joyce ....................... H04L 67/02
2021/0240556 A1* 8/2021 Breen ..................... G06Q 40/08
2023/0009127 A1 1/2023 Boyer
2024/0135027 A1* 4/2024 Herzberg ................ G06F 21/53
2024/0403444 A1* 12/2024 Jeevagunta ........... G06F 21/577
2025/0023714 A1* 1/2025 Kumar .................. H04L 9/0819
2025/0202919 A1* 6/2025 Nagaraj .............. H04L 63/1425

OTHER PUBLICATIONS

Static Program Analysis. Wikipedia, The Free Encyclopedia, Wikimedia Foundation,https://en.wikipedia.org/wiki/Static_program_analysis. Accessed Mar. 30, 2026.

* cited by examiner

*Primary Examiner* — Ario Etienne
*Assistant Examiner* — Kidest Mendaye
(74) *Attorney, Agent, or Firm* — M&B IP Analysts, LLC

(57) ABSTRACT

A method and system for Application Programming Interface (API) discovery for validation and exposure detection in a cloud computing environment is presented. The method includes generating an inspectable disk, wherein the inspectable disk is generated based on an original disk, the original disk deployed in the cloud computing environment; detecting an object on the inspectable disk based on inspection of the inspectable disk; analyzing the object for a hint of an API, wherein the hint indicates a potential API path in the cloud computing environment; generating a network access instruction based on the potential API path; executing the network access instruction over a network path; and determining that the potential API path is a validated API path based on a response of executing the network access instruction.

20 Claims, 4 Drawing Sheets

STATIC ANALYSIS TECHNIQUES FOR API PATH DISCOVERY

TECHNICAL FIELD

The present disclosure relates generally to the field of cybersecurity threat detection and specifically to the discovery of API paths which may indicate a potential cybersecurity threat, vulnerability, or data breach.

BACKGROUND

An API is a mechanism that enables two software components to communicate with each other using a set of definitions and protocols. There are multiple types of APIs such as a Simple Object Access Protocol (SOAP) API, a Remote Procedure Call (RPC) API, a WebSocket API, and a Representational State Transfer (REST) API.

API endpoints are final touchpoints in the API communication system. These include server Uniform Resource Locators (URLs), services, and other digital locations from where the information is sent and received between systems. API endpoints are specific URLs where a client can access an API. API endpoints serve as an authorized entryway that enables applications to interact with services, retrieve data, and perform various functions.

Since these API endpoints expose sensitive information and allow access to critical systems, they are prone to cybersecurity attacks. Thus, API endpoint security is essential to protect sensitive data, prevent data leaks, prevent unauthorized network access, prevent data manipulation, and misuse.

Challenges in the field of endpoint security include the lack of visibility in detecting endpoints. Reasons for the lack of visibility in detecting endpoints are that endpoints are not static and change dynamically. Furthermore, the use of API gateways and proxies obstruct endpoint detection by acting as the front interface for network traffic. Further, API gateways route the network traffic to different backend services, hiding the actual API endpoints from external view.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include generating an inspectable disk, where the inspectable disk is generated based on an original disk, the original disk deployed in the cloud computing environment. The method may also include detecting an object on the inspectable disk based on inspection of the inspectable disk. The method may furthermore include analyzing the object for a hint of an API, where the hint indicates a potential API path in the cloud computing environment. The method may in addition include generating a network access instruction based on the potential API path. The method may moreover include executing the network access instruction over a network path. The method may also include determining that the potential API path is a validated API path based on a response of executing the network access instruction. Other embodiments of this aspect include corresponding computer systems, apparatus, and computer programs recorded on one or more computer storage devices, each configured to perform the actions of the methods.

Implementations may include one or more of the following features. The method may include: detecting a plurality of hints, each corresponding to an unique potential API path. The method may include: detecting a plurality of hints, each corresponding to the potential API path. The method may include: detecting the potential API path in a record of a log of the cloud computing environment; and determining that the potential API path is a valid API path based on detecting the potential API path in the record. The method may include: initiating verification of the valid API path. The method where verification of the valid API path further may include: generating the network access instruction based on the potential API path and a network path including an external network. The method may include: executing the network access instruction only in response to determining that the potential API path is undetected in a record of a log of the cloud computing environment. The method may include: initiating verification of the potential API path, in response to determining that the potential API path is a valid API path. The method further may include: detecting the hint of the API path based on a result of static analysis on the detected object. Implementations of the described techniques may include hardware, a method or process, or a computer tangible medium.

In one general aspect, a device may include one or more processors configured to: generate an inspectable disk, where the inspectable disk is generated based on an original disk, the original disk deployed in the cloud computing environment; detect an object on the inspectable disk based on inspection of the inspectable disk; analyze the object for a hint of an API, where the hint indicates a potential API path in the cloud computing environment; generate a network access instruction based on the potential API path; execute the network access instruction over a network path; and determine that the potential API path is a validated API path based on a response of executing the network access instruction. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to:. The system may furthermore generate an inspectable disk, where the inspectable disk is generated based on an original disk, the original disk deployed in the cloud computing environment. The system may in addition detect an object on the inspectable disk based on inspection of the inspectable disk. The system may moreover analyze the object for a hint of an API, where the hint indicates a potential API path in the cloud computing environment. The system may also generate a network access instruction based on the potential API path. The system may furthermore execute the network access instruction over a network path. The system may in addition determine that the potential API path is a validated API path based on a response of executing the network access instruction. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: detect a plurality of hints, each corresponding to an unique potential API path. The system where the memory contains further instructions which when executed by the processing circuitry further configure the system to: detect a plurality of hints, each corresponding to the potential API path. The system where the memory contains further instructions which when executed by the processing circuitry further configure the system to: detect the potential API path in a record of a log of the cloud computing environment; and determine that the potential API path is a valid API path based on detecting the potential API path in the record. The system where the memory contains further instructions which when executed by the processing circuitry further configure the system to: initiate verification of the valid API path. The system where verification of the valid API path further may include: generating the network access instruction based on the potential API path and a network path including an external network. The system where the memory contains further instructions which when executed by the processing circuitry further configure the system to: execute the network access instruction only in response to determining that the potential API path is undetected in a record of a log of the cloud computing environment. The system where the memory contains further instructions which when executed by the processing circuitry further configure the system to: initiate verification of the potential API path, in response to determining that the potential API path is a valid API path. The system where the memory contains further instructions which when executed by the processing circuitry further configure the system to: detect the hint of the API path based on a result of static analysis on the detected object. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
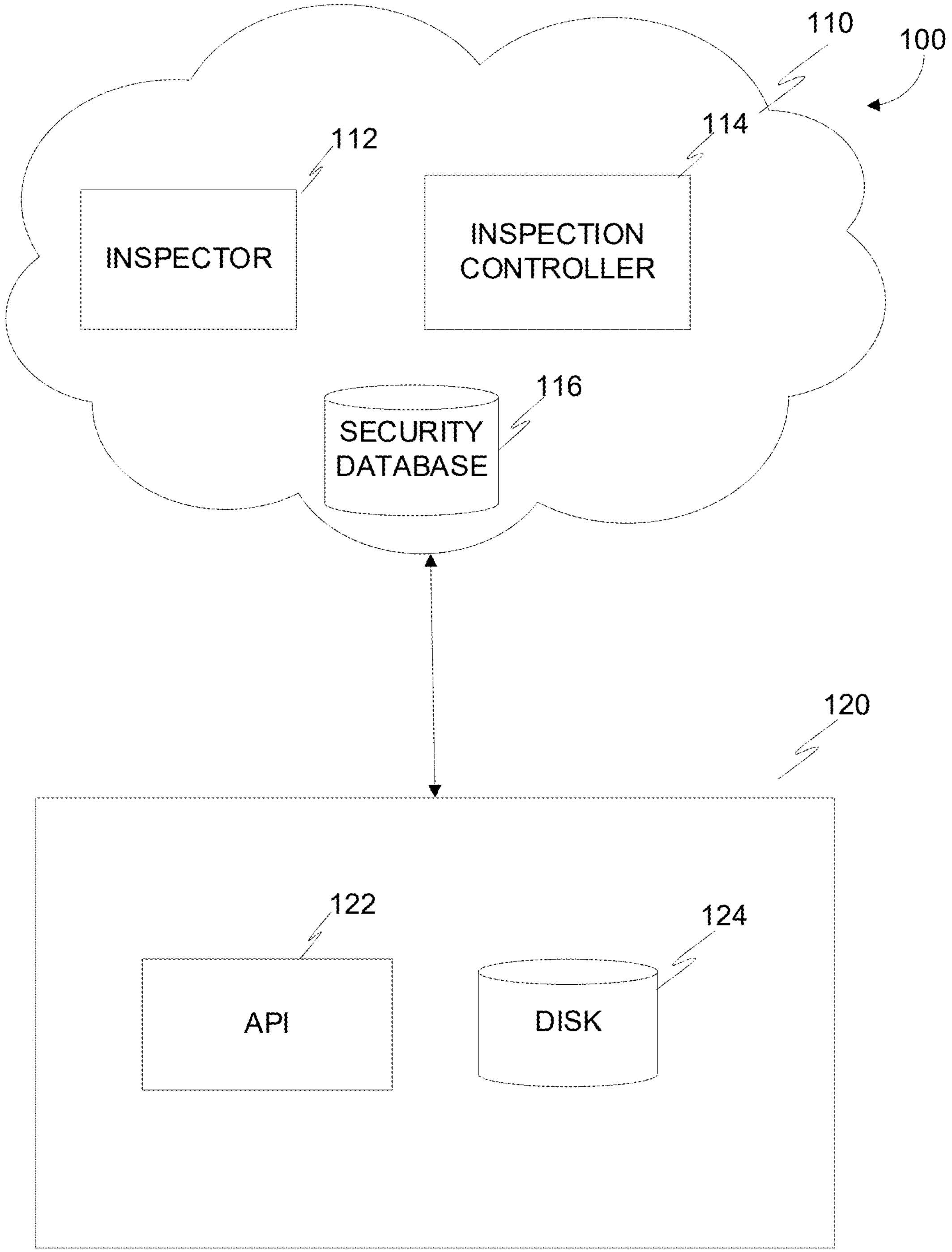
FIG. 1 is an example diagram of a cloud computing environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method for static analysis techniques for API path discovery in a cloud computing environment. The disclosed embodiments provide API path discovery based on associating API hints to detect API paths. It is advantageous to utilize API hints to detect API paths because it provides for a more precise and accurate detection of API endpoints that may be potentially exposed . . . . Further, it is advantageous to accurately detect API endpoints as they provide valuable insight for the detection and prevention of potential cybersecurity threats, vulnerabilities, data breaches, and the like.

FIG. 1 is an example schematic diagram 100 of a cloud computing environment, implemented in accordance with an embodiment. In an embodiment, a cloud computing environment includes a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like.

A cloud computing environment includes a workload 120. In various embodiments, a workload 120 includes cloud entities deployed as components of the workload 120. In an embodiment, a cloud entity is a principal, a resource, a combination thereof, and the like. In an embodiment, a resource is a cloud entity which provides access to a compute resource, such as a processor, a memory, a storage, and the like. In some embodiments, a resource is a virtual machine, a software container, a serverless function, and the like. In an embodiment, a resource is a software application, such as a webserver, a gateway, a load balancer, a web application firewall (WAF), an appliance, and the like.

In certain embodiments, an Application Programming Interface (API) 122, a disk 124, and the like, are components of the workload 120.

In various embodiments, the disk 124 is a physical data storage device, such as a hard disk drive (HDD), a solid-state drive (SSD), and the like. In some embodiments, the disk 124 is a virtual disk which is configured to store data for the workload 120, cloud computing environment, and the like. In an embodiment, the disk 124 is configured to store applications, application data, software files, libraries, binaries, application states, a combination thereof, and the like. In an embodiment, the disk 124 is an original disk, from which an inspectable disk is generated.

In an embodiment, the API 122 is a software interface that enables software applications, software components, and the like, to communicate with each other using a set of definitions and protocols. In various embodiments, the API 122 is configured to enable systems, software components, principals, cloud entities, resources, hardware components, and the like, to communicate with an application or plurality of applications stored in the disk 124. In some embodiments, the API 122 includes various types of APIs including Simple Object Access Protocol (SOAP) APIs, Remote Procedure Calls (RPC) APIs, WebSocket APIs, REST APIs, and the like.

In some embodiments, the API 122 is configured to receive an API call from a system, resource, component, application, a combination thereof, and the like, of the cloud computing environment. In an embodiment, an API call is a request from an application, client, component, system, and the like, through the API 122 to retrieve data, or perform a specific function. In some embodiments, an API call is an API request which includes a protocol such as a HyperText Transfer Protocol (HTTP) (e.g., GET, POST, PUT, PATCH, etc.), a Uniform Resource Locator (URL) endpoint, request parameters, a header, a combination thereof, and the like.

In various embodiments, the workload 120 is monitored by the inspection environment 110. In some embodiments, the inspection environment 110 includes an inspector 112, an inspection controller 114, a security database 116, a combination thereof, and the like.

In various embodiments, the inspector 112 is configured to access applications, software code, code objects, software data, software files, binaries, libraries, software images, and the like, from the disk 124, an inspectable disk, and the like. In some embodiments, the inspector 112 is configured to initiate static analysis on the software applications, code objects, software data, software files, and the like, from the disk 124, inspectable disk, and the like.

In an embodiment, the inspector 112 is configured to inspect an inspectable disk for a cybersecurity object. For example, in an embodiment, a cybersecurity object is a password, a certificate, a cryptographic key, a software, an application, a library, a binary, a configuration file, a file-system, a combination thereof, and the like.

In some embodiments, the inspector 112 is configured to initiate static analysis on a configuration file, a code file, a code object, a software file, a combination thereof, and the like, to detect API paths, API hints, API software applications, code objects, software data, software files, and the like. In an embodiment, an API hint is an extracted line of code, regex, etc., which indicates a potential API path.

In certain embodiments, the inspection environment 110 further includes an inspection controller 114. In some embodiments, the inspection controller 114 is configured to assign specific inspection tasks to the inspector 112. In various embodiments, the inspection controller 114 is configured to define inspection policies, rules, conditional rules, and the like, for the inspector 112. In an embodiment, the inspection controller 114 is configured to determine which object, entity, resource, code object, software application, and the like, the inspector 112 should inspect. In certain embodiments, the inspection controller 114 is configured to determine the order of which object, entity, resource, code object, software application, the inspector 112 should inspect. In an embodiment, the inspection controller 114 is configured to allocate an inspector 112, inspection resources, etc., for inspecting an inspectable disk. In some embodiments, the inspection controller 114 is configured to initiate generation of an inspectable disk. This is discussed in more detail with respect to FIG. 2 below.

In various embodiments, the security database 116 is configured to store a representation of a cloud computing environment, for example, based on a unified data schema. In an embodiment, a unified data schema represents computing resources, entities, and the like, from a first cloud computing platform (e.g., AWS) and a second cloud computing platform (e.g., GCP) utilizing a single data schema.

In an embodiment, a representation of a resource, such as the workload 120, is stored in the security database 116. In an embodiment, the security database 116 includes a plurality of databases. In certain embodiments, the security database 116 is implemented as a graph database, tabular database, columnar database, a combination thereof, and the like.

In various embodiments, the security database 116 is configured to store representations of entities, objects, resources, systems, enrichment, insights, detections, findings, forensic artifacts, remediation actions, cybersecurity issues, cybersecurity threats, a combination thereof, and the like, of a cloud computing environment. In an embodiment, the representation includes a visual depiction, numerical values, binary values, nodes, edges, a combination thereof, and the like.

In an embodiment, the security database 116 is configured to store a log of API calls, API responses, API 122 interactions with other entities, API communication, and the like. In certain embodiments, the security database 116 is configured to store inspection results, inspection detections, inspection data, generated from the inspector's inspection of the disk, of the inspectable disk, and the like. In an embodiment, the security database 116 is configured to store static analysis results from the inspector 112 conducting static analysis on an object, a code object, a configuration file, a software application, a software program, a source code, a code file, a combination thereof, and the like.

In an embodiment, the inspector 112 is configured to initiate static analysis on an inspectable disk and detect API hints from code objects thereon. For example, in executable code an API hint may be "/users", "/checkbalance", and the like.

Figure 2:
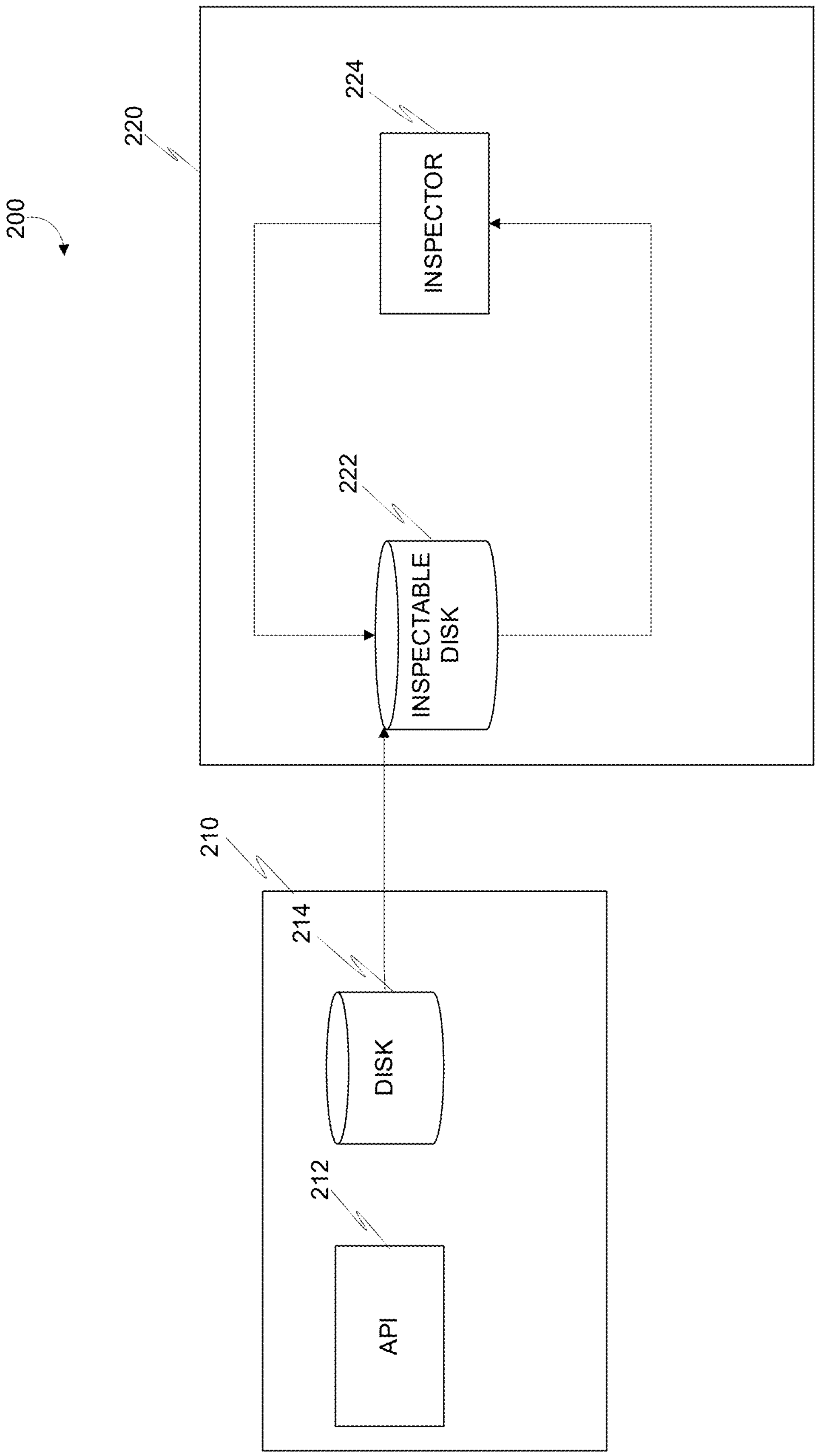
FIG. 2 is an example schematic diagram of a workload and an inspectable disk, implemented in accordance with an embodiment.

FIG. 2 is an example schematic diagram 200 of a workload and an inspectable disk, implemented in accordance with an embodiment.

In an embodiment, an API 212 and a disk 214 are components of a workload 210. According to an embodiment, the workload 210 is implemented as a virtual machine, a software container, a serverless function, a combination thereof, and the like. In an embodiment, the API 212 is a software interface that enables software applications, software components, and the like, to communicate with each other using a set of definitions and protocols. In various embodiments, the API 212 is configured to enable systems, software components, principals, cloud entities, resources, hardware components, and the like, to communicate with an application, plurality of applications, etc., running on the workload 210. In some embodiments, an application 212is executed on a workload 210, and code objects, binary files, software libraries, etc., are stored in a disk 214 of the workload 210. According to an embodiment, a software application is stored on a disk 214, and when executed by the workload 210, the software application includes a process, thread, etc., which is executed at runtime.

In some embodiments, the disk 214 is a virtual disk which stores data for the workload 210. In an embodiment, the disk 214 configured to store applications, application data, software files, libraries, binaries, application states, a combination thereof, and the like. In an embodiment, the disk 214 is utilized to generate an inspectable disk 222.

In various embodiments, the inspectable disk 222 is a virtual disk which is generated based on the disk 214, which is also referred to as an original disk. In some embodiments, the inspectable disk 222 is a cloned disk, duplicate disk, copy of the disk 214. According to an embodiment, a cloned disk is a disk which is generated to become immediately available. In an embodiment, generating a cloned disk (as the inspectable disk 222) includes generating a pointer for an inspectable disk which points to the same storage addresses of the disk 214.

In an embodiment, a snapshot of the disk 214 is generated. In various embodiments, a snapshot captures the state of the disk 214, the state of a virtual machine, and the like, at a particular point in time. In an embodiment, a snapshot is utilized to generate an inspectable disk 222 containing the data, files, applications, and the like, captured from the disk 214. In certain embodiments, the snapshot is mounted to a volume, virtual disk, and the like making its data, files, applications, and the like, accessible. Thus, a snapshot of a disk 214 is not a disk, but the inspectable disk 222 can be generated from the snapshot. It should be understood that the snapshot is not inspectable in and of itself, according to an embodiment, and further that the entire disk 214 need to be snapshotted prior to being able to generate an inspectable disk 222 therefrom. It is therefore advantageous, according to certain embodiments, to generate the inspectable disk 222 as a cloned disk.

In an embodiment, the inspectable disk 222 is generated from dereferencing a pointer of the disk 214 to obtain a pointer or reference of the data structure defining the disk 214 and using the pointer or reference to clone the disk 214. In various embodiments, the inspectable disk 222, an inspector 224, a combination thereof, and the like, are deployed in an inspection environment 220.

In various embodiments, the inspector 224 is configured to access applications, configuration files, code files, code objects, software data, software files, binaries, libraries, software images, and the like, from the inspectable disk 222. In certain embodiments, configuration files, code files, code objects, software files, and the like, include API paths, hints of API paths, API calls, API data, a combination thereof, and the like. In an embodiment, a hint of an API path indicates that an API path (or API endpoint) may be present, is a potential API path, etc. It is useful to generate potential API paths in order to discover a computing environment's true exposure, as each API path is a potential for a cybersecurity attack into the computing environment.

In some embodiments, the inspector 224 is configured to initiate static analysis on the configuration files, code files, code objects, software files, and the like, to retrieve and detect API paths, API hints, API software applications, code objects, software data, software files, and the like. In an embodiment, the inspector 224 is configured to inspect the inspectable disk 222 for a cybersecurity object. For example, in an embodiment, a cybersecurity object is a password, a certificate, a secret, a cloud key, a cryptographic key, a software, an application, a library, a binary, a configuration file, a filesystem, a combination thereof, and the like.

Figure 3:
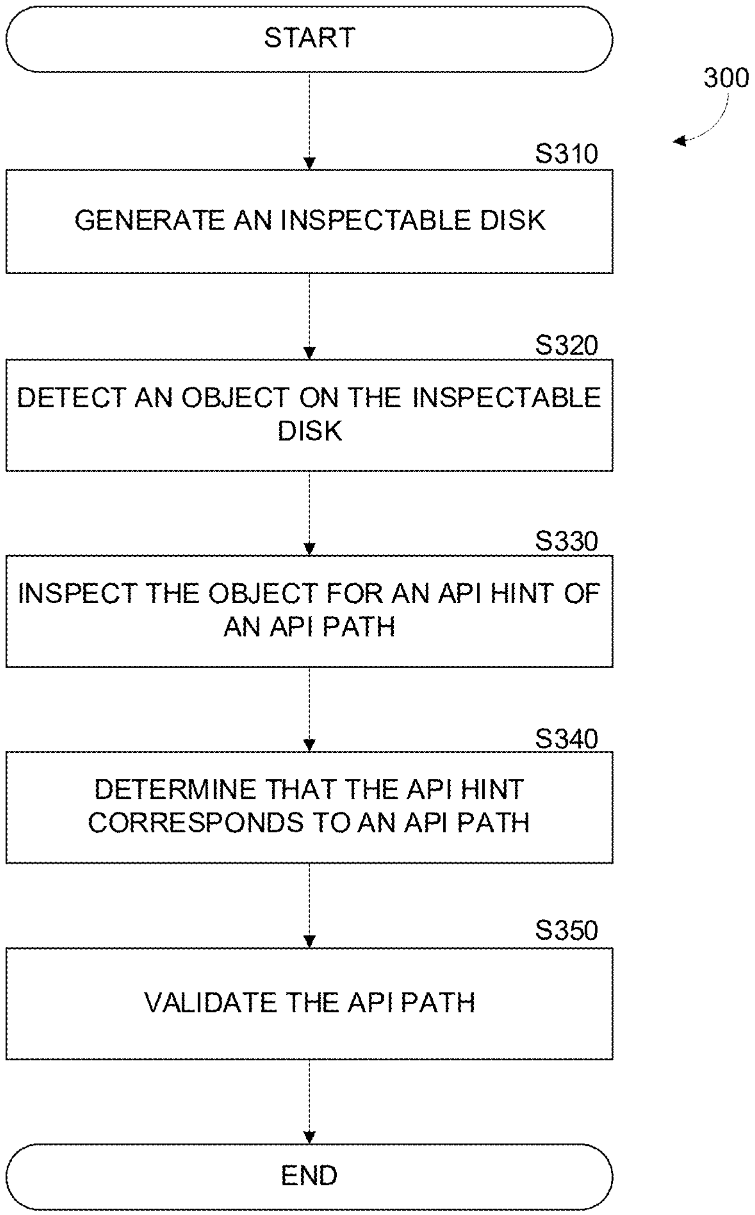
FIG. 3 is an example flowchart of a method for validating an API path, implemented in accordance with an embodiment.

FIG. 3 is an example flowchart 300 of a method for validating an API path based on an API hint, implemented in accordance with an embodiment. It is advantageous, to utilize API hints for API path discovery as this provides for the efficient detection of exposed API paths that may indicate potential cybersecurity threats, vulnerabilities, exposures, and the like.

At S310, an inspectable disk is generated. In an embodiment, an inspectable disk is a virtual disk, a virtual hard drive (VHD), etc. In some embodiments, the inspectable disk is generated from a disk image, a virtual file system, and the like. In an embodiment, the inspectable disk is a cloned disk, duplicate disk, and the like. In an embodiment, the inspectable disk is based on an original disk, the original disk associated with a virtual machine, a software container, a serverless function, and the like, deployed in a computing environment such as a cloud computing environment.

In an embodiment, a snapshot is utilized to generate an inspectable disk containing the data, files, applications, and the like, captured from an original disk. In various embodiments, a snapshot captures the state of data on an original disk at a particular point in time. In certain embodiments, a snapshot is mounted to a volume, virtual disk, and the like. In some embodiments, mounting the snapshot to a volume, disk, and the like, allows for its data, files, applications, and the like, to be accessible.

In an embodiment, an inspectable disk is generated from cloning an original disk. In some embodiments, cloning occurs by dereferencing an original disk to obtain a pointer, reference, etc., of a data structure defining the original disk. In some embodiments, the pointer, reference, and the like is utilized to clone the original disk into the inspectable disk.

At S320, an object is detected on the inspectable disk. In some embodiments, an object, a cybersecurity object, a code object, a file, a configuration file, a code file, a source file, an application, and the like, is detected on the inspectable disk. In an embodiment, an inspector is configured to access the inspectable disk. In some embodiments, the inspector is configured to access the configuration files, code files, libraries, a combination thereof, and the like on the inspectable disk.

In an embodiment, the inspector is configured to inspect the configuration files, code files, libraries, a combination thereof, and the like, for objects, code objects, and the like. In an embodiment, objects, code objects, and the like, are detected in response to the inspection results of the inspector inspecting the inspectable disk contents.

In some embodiments, a plurality of objects are detected. In an embodiment, detecting an object includes identifying a file, a folder, a filesystem, a registry record, a combination thereof, and the like.

At S330, the object is inspected for a hint of an API path. In some embodiments, an API path includes an address that provides access to an API. In some embodiments, an API path includes a protocol command such as a Hypertext Transfer Protocol (HTTP) (e.g., GET, POST, PUT, PATCH, etc.) and a Uniform Resource Locator (URL) endpoint. For example, in an embodiment, a command utilizing an API endpoint is "GET https://api.diskcontents.com/v1 accounts/2400."

In some embodiments, the inspector is configured to inspect a detected object of the inspectable disk for a hint of an API path. In an embodiment, a hint of an API path is an indication of a potential API path utilized by a cloud computing environment, workload, and the like. In an embodiment, an API path is a component or portion of a full API path, which is utilized as an API endpoint.

For example, in an embodiment, a hint of an API path is a version number, a name of the resource the API is interacting with, a resource identifier, query parameters, a combination thereof, and the like. In an embodiment, for example, a hint of an API path includes "v2/useraccount/12345/verification."

In some embodiments, the inspector is configured to detect a hint of an API path based on conducting static analysis on the detected objects of the configuration files, code files, source files, and the like, of which are stored in the inspectable disk. In an embodiment, an inspector is configured to perform static analysis by analyzing the object, code object, and the like, without executing the object as code. In an embodiment, static analysis includes parsing the objects in order to examine the objects and detect an API hint. In certain embodiments, static analysis utilizes pattern matching to detect API hints from objects based on using a predefined pattern for an API hint and comparing it to the detected object.

At S340, an API hint is determined to correspond to an API path. In various embodiments, an API hint is compared to a plurality of API calls stored in a log, a database, a security database, a combination thereof, and the like, to determine if the API hint corresponds to an actual API path. For example, in an embodiment, an API hint of "v1/account/24/file" is compared to a log of a cloud computing environment which includes the API call "GET https://api.com/v1/account/24/file", and since the API hint matches a portion of the API call, the API hint does correspond to the API path.

In some embodiments, an API hint does not correspond to an API path in response to the API hint not matching a portion of any API call, stored in the log, database, security database, and the like. For example, in an embodiment, an API hint of "v5/users/2300" does not match any API call stored in a log, a database, a security database, and the like, thus, it is determined that the API hint does not correspond to any previously detected API path, e.g., an API path detected in a log.

However, not all API paths are actually called, and some API endpoints may be accessible, rarely accessed, etc., and thus do not appear in a log, for example, at a time of checking. It is therefore advantageous to store a list, for example, of potential API paths which are generated based on an API hint, and determine if a potential API is a valid API path.

In certain embodiments, where an API path is detected in a log based on an API hint, the API path may be verified, in order to determine if the API path is an API endpoint which is an exposed API endpoint. In an embodiment, an exposed API endpoint is a cybersecurity issue, as it is a point of exposure for a computing environment.

At S350, the API path is validated. In an embodiment, in response to the determination that an API hint corresponds to an API path, the API path is not validated, since it is detected for example, in a log, but instead is verified. In some embodiments, an API path is generated based on a detected API hint, a protocol, a domain (e.g., from a base URL), and a combination thereof. In various embodiments, a network access instruction is executed based on an API endpoint which in turn is generated based on the generated API path.

In certain embodiments, a network access instruction includes an HTTP protocol command, a header, an API path, query parameters, an API key, authentication details, payload requests, a combination thereof, and the like. For example, in an embodiment a network access instruction includes an HTTP command such as "GET", "POST", "PUT", "DELETE", and the like. In an embodiment, for example, a network access instruction includes a header such as "Content-Type: application/json", which indicates that the content of the request is an application in a JavaScript Object Notation (JSON) format.

In some embodiments, an API is configured to process the network access instruction and generate a network access instruction response.

In an embodiment, the network access response is processed to determine whether the API path is valid. For example, in an embodiment, the network access response of "ERROR: access denied", indicates that the API path is valid, and it is verified to be unexposed. In an embodiment, for example, the network access response of "error not found", indicates that the API path is invalid.

According to an embodiment, an API path is generated based on an API hint. A potential API endpoint is generated based on the API path, and a network access instruction is generated for the API endpoint to determine if the API path is a valid API path. Where an API path is detected, for example, in a cloud log, based on the API hint, validation is replaced with verification.

In some embodiments, verification is a process which includes determining if an API endpoint is exposed, for example, from an external network which is external to the computing environment in which the API endpoint is deployed. In some embodiments, verification includes executing a network access instruction over a network path which includes a public network, external network, a combination thereof, and the like. In an embodiment, an API path may be valid, invalid, verified, and unverified. A valid API path is one which is accessible, a verified API path is accessible from an external network, an invalid API path is not a functioning API path, and an unverified API path is an API path for which no determination has been made as to whether it is exposed or not.

Figure 4:
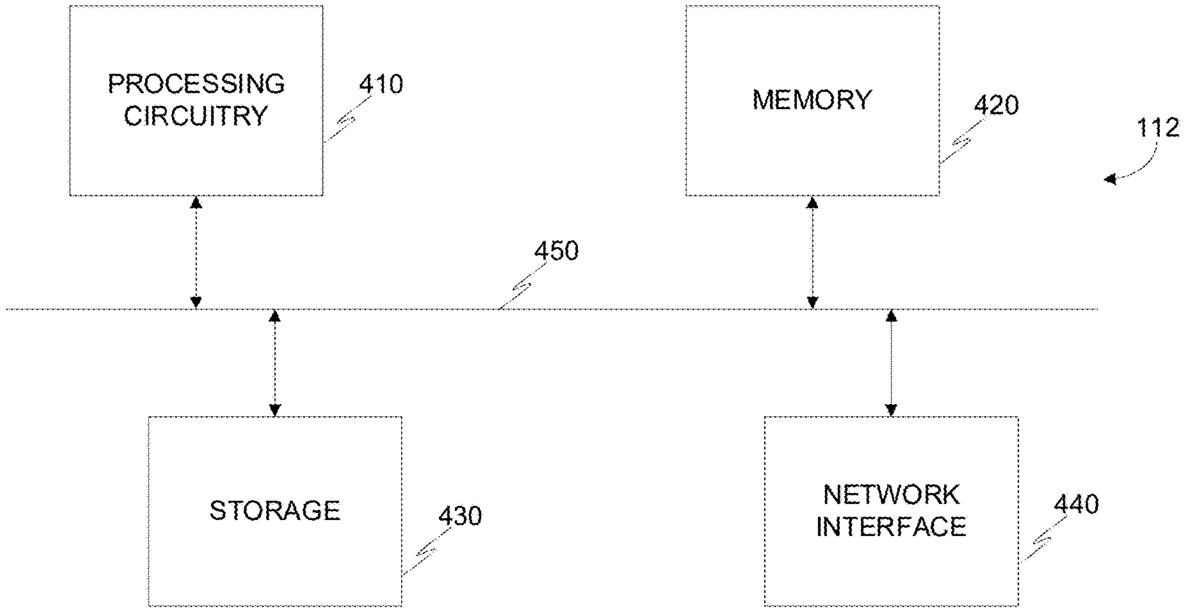
FIG. 4 is an example schematic diagram of an inspector 112, implemented in accordance with an embodiment.

FIG. 4 is an example schematic diagram of an inspector 112, according to an embodiment. The inspector includes a processing circuitry 410 coupled to a memory 420, a storage 430, and a network interface 440. In an embodiment, the components of the inspector 112 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the inspector 112 to communicate with, for example, an inspection controller 114, a security database 116, and the like.

It should be understood that the embodiments described herein are not limited to the specific architecture illustrated in FIG. 4, and other architectures may be equally used without departing from the scope of the disclosed embodiments.

Furthermore, in certain embodiments the inspector 112, the inspection controller 114, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for Application Programming Interface (API) discovery for validation and exposure detection in a cloud computing environment, comprising:

generating an inspectable disk, wherein the inspectable disk is generated based on an original disk, the original disk deployed in the cloud computing environment;

detecting a code object on the inspectable disk based on inspection of the inspectable disk;

statically analyzing the code object to detect a hint of an API, wherein the hint indicates a potential API path in the cloud computing environment;

generating a network access instruction based on the potential API path;

executing the network access instruction over a network path; and determining that the potential API path is a validated API path based on a response of executing the network access instruction.

2. The method of claim 1, further comprising:

detecting a plurality of hints, each corresponding to a unique potential API path.

3. The method of claim 1, further comprising:

detecting a plurality of hints, each corresponding to the potential API path.

4. The method of claim 1, further comprising:

detecting the potential API path in a record of a log of the cloud computing environment; and determining that the potential API path is a valid API path based on detecting the potential API path in the record.

5. The method of claim 1, further comprising:

initiating verification of the valid API path.

6. The method of claim 5, wherein verification of the valid API path further comprises:

generating the network access instruction based on the potential API path and a network path including an external network.

7. The method of claim 1, further comprising:

executing the network access instruction only in response to determining that the potential API path is undetected in a record of a log of the cloud computing environment.

8. The method of claim 7, further comprising:

initiating verification of the potential API path, in response to determining that the potential API path is a valid API path.

9. The method of claim 1, further comprises:

detecting the hint of the API path based on a result of static analysis on the detected object.

10. The method of claim 1, wherein the hint is a hint of an API instruction.

11. A device for Application Programming Interface (API) discovery for validation and exposure detection in a cloud computing environment comprising:

one or more processors configured to:

generate an inspectable disk, wherein the inspectable disk is generated based on an original disk, the original disk deployed in the cloud computing environment;

detect a code object on the inspectable disk based on inspection of the inspectable disk;

statically analyze the code object to detect a hint of an API, wherein the hint indicates a potential API path in the cloud computing environment;

generate a network access instruction based on the potential API path;

execute the network access instruction over a network path; and determine that the potential API path is a validated API path based on a response of executing the network access instruction.

12. A system for Application Programming Interface (API) discovery for validation and exposure detection in a cloud computing environment comprising:

a processing circuitry;

a memory, the memory containing instructions that, when executed by the processing circuitry, configure the system to:

generate an inspectable disk, wherein the inspectable disk is generated based on an original disk, the original disk deployed in the cloud computing environment;

detect a code object on the inspectable disk based on inspection of the inspectable disk;

statically analyze the code object to detect a hint of an API, wherein the hint indicates a potential API path in the cloud computing environment;

generate a network access instruction based on the potential API path;

execute the network access instruction over a network path; and determine that the potential API path is a validated API path based on a response of executing the network access instruction.

13. The system of claim 12, wherein the memory contains further instructions which when executed by the processing circuitry further configure the system to:

detect a plurality of hints, each corresponding to a unique potential API path.

14. The system of claim 12, wherein the memory contains further instructions which when executed by the processing circuitry further configure the system to:

detect a plurality of hints, each corresponding to the potential API path.

15. The system of claim 12, wherein the memory contains further instructions which when executed by the processing circuitry further configure the system to:

detect the potential API path in a record of a log of the cloud computing environment; and determine that the potential API path is a valid API path based on detecting the potential API path in the record.

16. The system of claim 12, wherein the memory contains further instructions which when executed by the processing circuitry further configure the system to:

initiate verification of the valid API path.

17. The system of claim 16, wherein verification of the valid API path further comprises:

generating the network access instruction based on the potential API path and a network path including an external network.

18. The system of claim 12, wherein the memory contains further instructions which when executed by the processing circuitry further configure the system to:

execute the network access instruction only in response to determining that the potential API path is undetected in a record of a log of the cloud computing environment.

19. The system of claim 18, wherein the memory contains further instructions which when executed by the processing circuitry further configure the system to:

initiate verification of the potential API path, in response to determining that the potential API path is a valid API path.

20. The system of claim 12, wherein the memory contains further instructions which when executed by the processing circuitry further configure the system to:

detect the hint of the API path based on a result of static analysis on the detected object.

* * * * *